Figure 3:
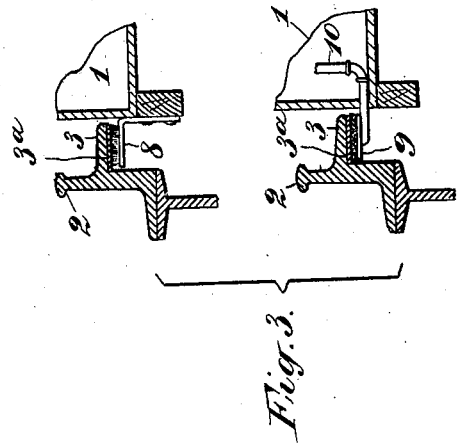

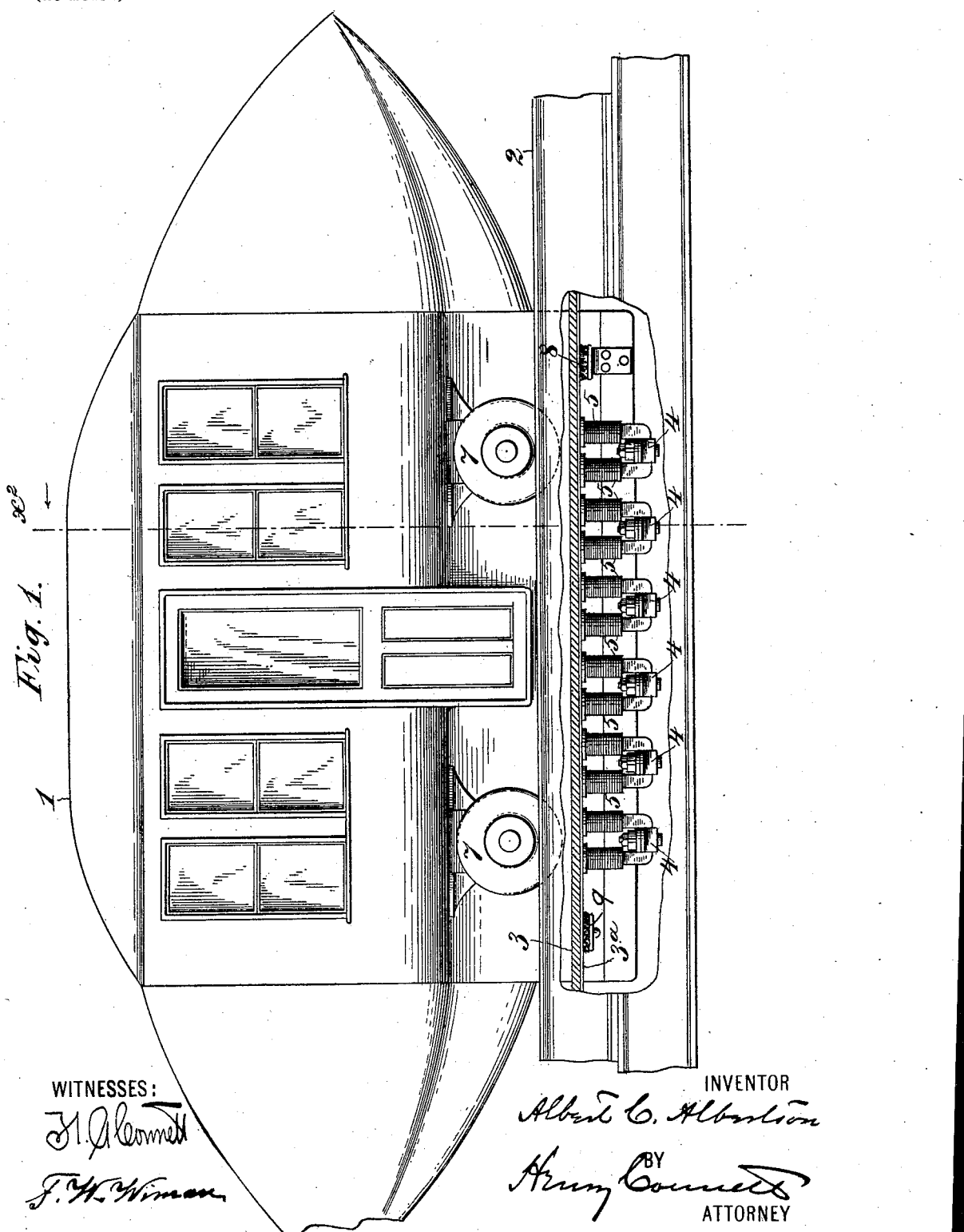

No. 714,851.  
A. C. ALBERTSON.  
RAILWAY AND CAR AND MAGNETIC APPLIANCES THEREFOR.  
(Application filed Apr. 8, 1902.)  
Patented Dec. 2, 1902.

(No Model.)  
6 Sheets—Sheet 2.

WITNESSES:

INVENTOR
Albert C. Albertson
BY
Henry Connett
ATTORNEY

No. 714,851. Patented Dec. 2, 1902.
A. C. ALBERTSON.
RAILWAY AND CAR AND MAGNETIC APPLIANCES THEREFOR.
(Application filed Apr. 8, 1902.)
(No Model.) 6 Sheets—Sheet 3.
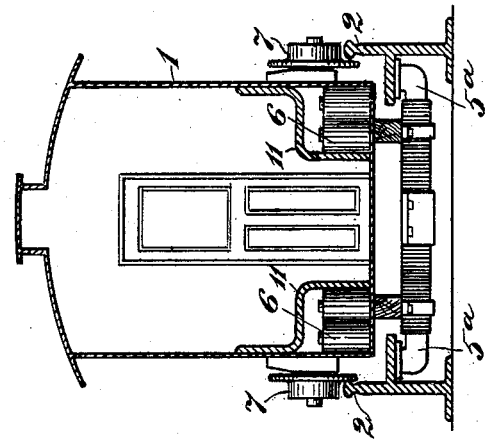
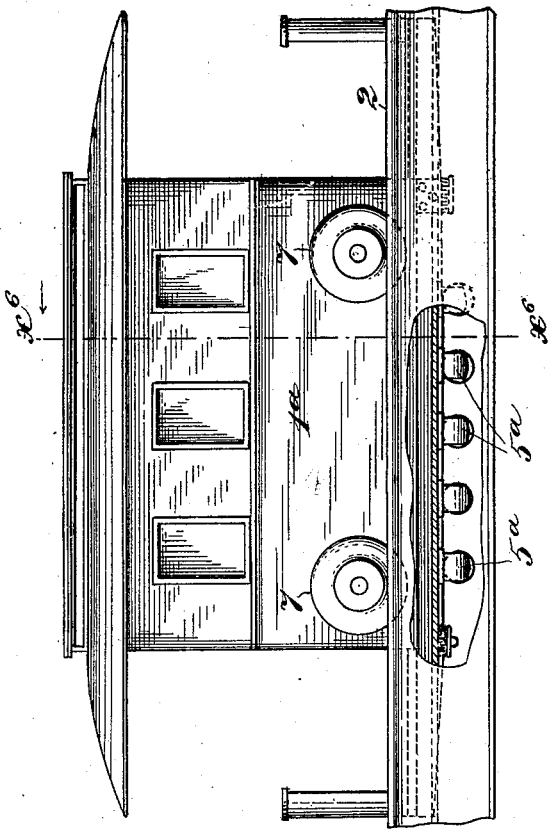

No. 714,851. Patented Dec. 2, 1902.
A. C. ALBERTSON.
RAILWAY AND CAR AND MAGNETIC APPLIANCES THEREFOR.
(Application filed Apr. 8, 1902.)
(No Model.) 6 Sheets—Sheet 4.
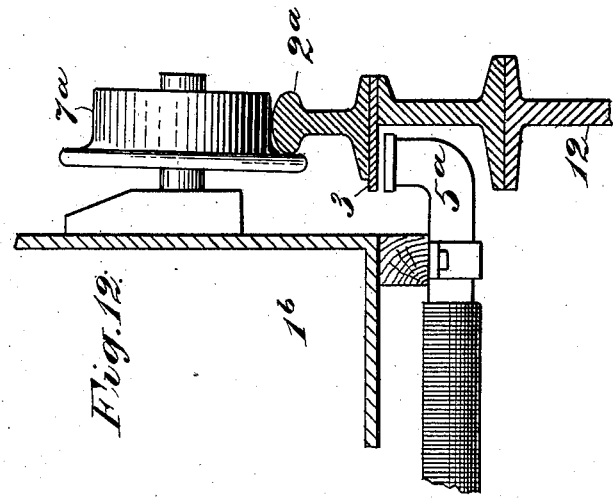
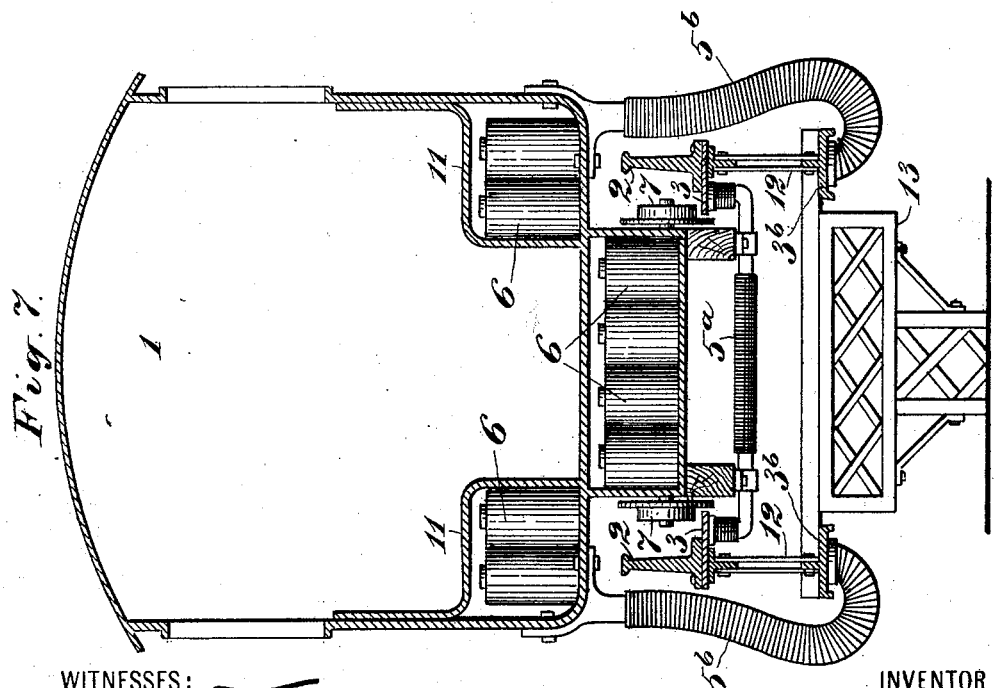
WITNESSES: INVENTOR
Albert C. Albertson
BY
Henry Connett
ATTORNEY No. 714,851. Patented Dec. 2, 1902.
A. C. ALBERTSON.
RAILWAY AND CAR AND MAGNETIC APPLIANCES THEREFOR.
(Application filed Apr. 8, 1902.)
(No Model.) 6 Sheets—Sheet 5.

WITNESSES:

INVENTOR
Albert C. Albertson
BY
ATTORNEY

No. 714,851. Patented Dec. 2, 1902.
A. C. ALBERTSON.
RAILWAY AND CAR AND MAGNETIC APPLIANCES THEREFOR.
(Application filed Apr. 8, 1902.)
(No Model.) 6 Sheets—Sheet 6.
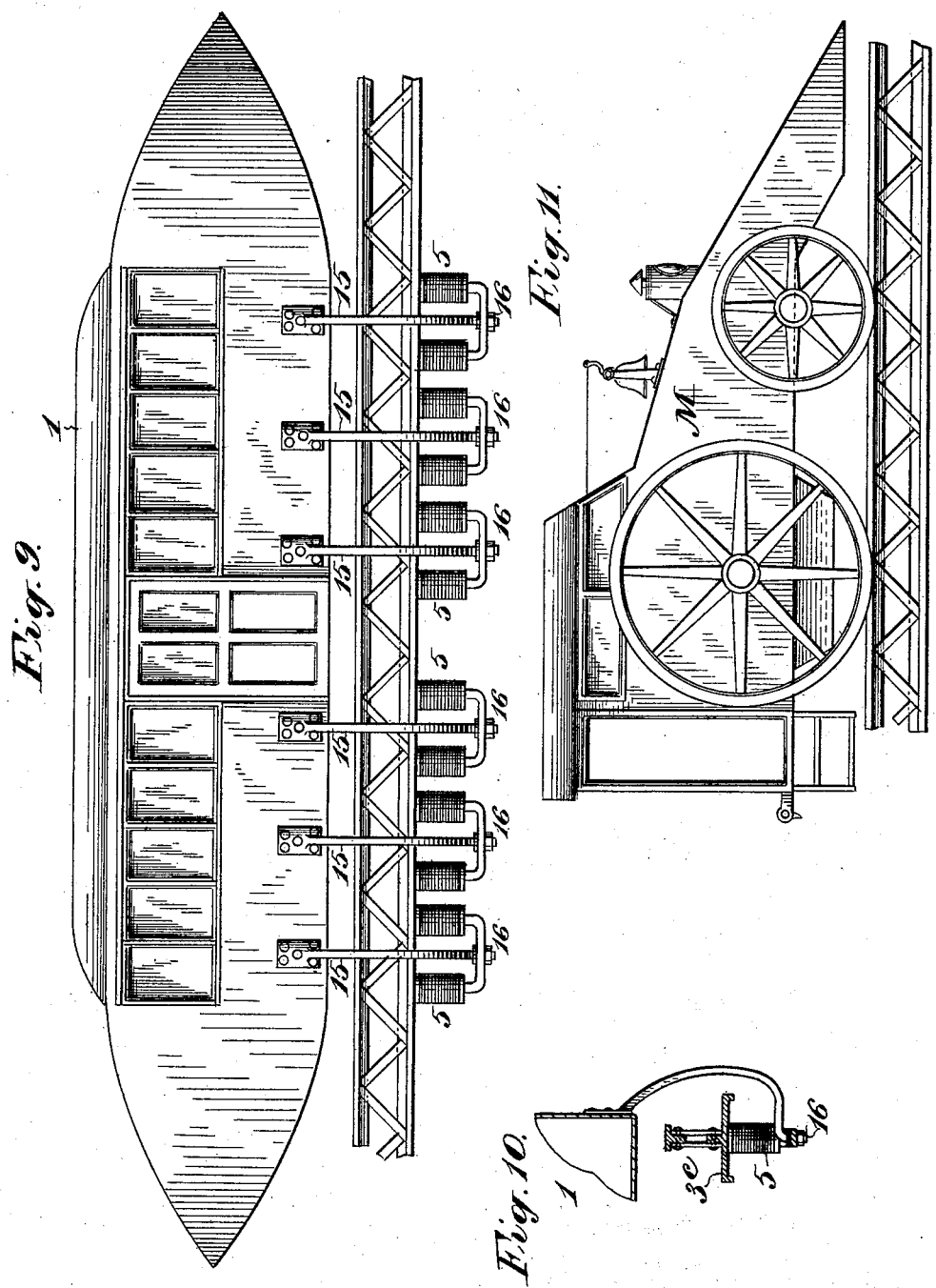
WITNESSES:
INVENTOR
Albert C. Albertson
BY
Henry Connett
ATTORNEY

UNITED STATES PATENT OFFICE.

ALBERT C. ALBERTSON, OF NEW YORK, N. Y.

RAILWAY AND CAR AND MAGNETIC APPLIANCES THEREFOR.

SPECIFICATION forming part of Letters Patent No. 714,851, dated December 2, 1902.

Application filed April 8, 1902. Serial No. 101,951. (No model.)

*To all whom it may concern:*

Be it known that I, ALBERT C. ALBERTSON, a citizen of the United States, residing in the city, county, and State of New York, have invented certain new and useful Improvements in Railways and Cars and Magnetic Appliances Therefor, of which the following is a specification.

This invention relates in part to the way or track and in part to the cars or vehicles of a railway system; and the object is to reduce the friction incident to the movement of the cars along the track or way, whereby high speed may be attained with trains drawn by light locomotives or motor-vehicles.

In carrying out the invention, which will be in the main applied to the cars drawn by a locomotive of any suitable type, magnetism is employed in such a manner as to support wholly or in part the car and its load. Thus by adjusting the relations between the magnetic attractive force or pull and the load the friction tending to resist the movement of the car along the track or way may be reduced to a minimum, and thus one of the most serious factors operating against high speeds will be measurably eliminated.

The principle involved in the present invention may be illustrated as follows: Suppose that a magnet weighing two pounds rests on the upper surface of a horizontally-disposed smooth bar of iron or steel in the nature of a railway-track and that the attractive force or pull of the magnet equals five pounds, the coefficient of friction resisting the sliding of the magnet along the track will then be that due to a load of seven pounds. Now if the track and magnet be inverted or turned over, so the magnet is suspended from the lower face of the bar, the weight of the magnet must then be deducted from the magnetic pull and the coefficient of friction will be that due to three pounds. Now if a weight of two pounds be suspended from the magnet the coefficient of friction will be reduced to that due to a load of one pound, while the actual load in weight will be four pounds. Thus up to a certain point the friction will decrease with the increase of the load under the conditions last named.

According to one embodiment of the present invention the above principle is applied by providing a car with magnets having their poles directed upward and adherent to the under surface of track-rails smooth on their under sides and forming armatures. The magnets uphold the load, including the weight of the car and its freight or passengers. Now if, for example, this load is two thousand pounds and the lifting power of the magnets is two thousand five hundred pounds it will be obvious that the friction to overcome will be that due to a pressure on the rails of two thousand five hundred pounds minus two thousand pounds, or five hundred pounds only.

Another phase of the invention includes a car provided with wheels rolling on a track and magnets on the car with their poles directed upward under continuous metal track rails, but not necessarily in contact with the smooth under surface of said rails. Now if the poles of the magnets be nearly in contact with the said surface and have a force or pull under these conditions capable of lifting, for example, two thousand pounds, and the load comprising the car, its appurtenances, and freight or passengers, is two thousand five hundred pounds obviously the action of the magnets will compensate all but five hundred pounds of the load, and thus reduce the power required to draw the car in the same proportion. Obviously there may be a series of magnets along the track or railway so placed as to convert the armature-rails into magnets. This would be only a further extension of the invention.

The details of construction whereby my invention may be carried out are illustrated in the accompanying drawings and will be fully hereinafter described.

Figure 4:
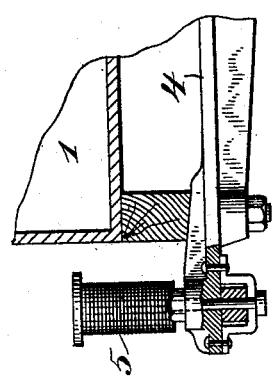
Figure 2:
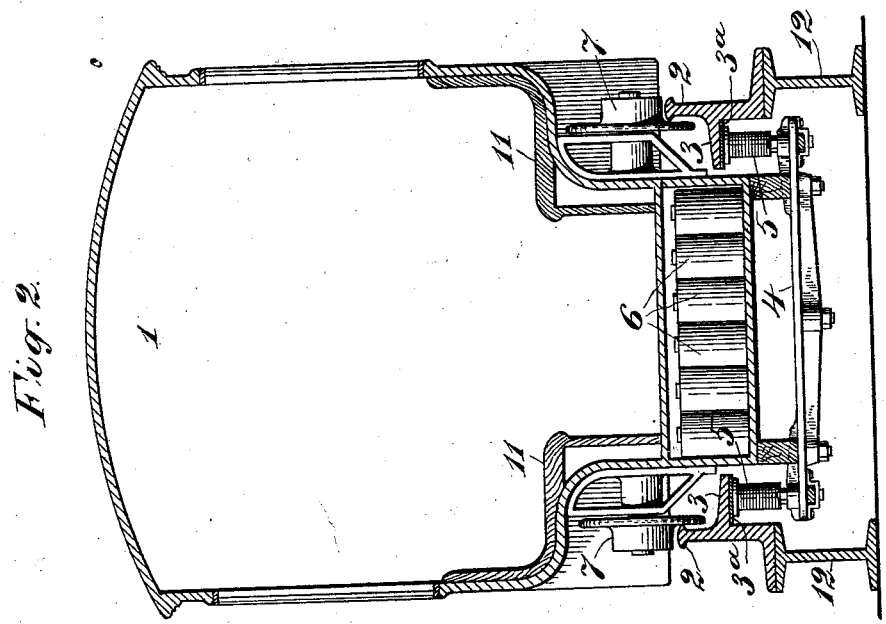
Figure 8:
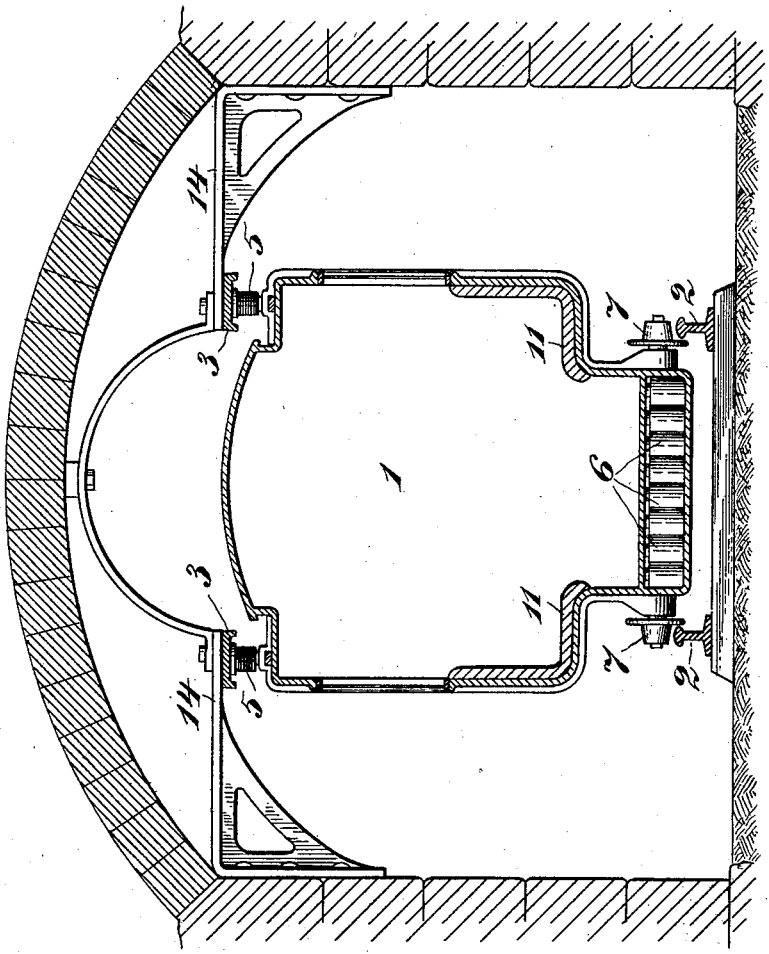

In the said drawings, Figure 1 is a side elevation of a car and railway, illustrating one form of the invention; and Fig. 2 is a vertical transverse section substantially at $x^2$ in Fig. 1. Fig. 3 includes detail views of the brush and oiler. Fig. 4 is an enlarged detail view showing the mounting of the magnets. Fig. 5 is a side elevation illustrating a slightly-different form of the invention, and Fig. 6 is a transverse vertical section of same at $x^6$ in Fig. 5. Fig. 7 is a transverse section of a car and the track, illustrating a form of the invention where two sets of magnets are employed, one on the inside and the other on the outside of the track-rail. Fig. 8 is a cross-section showing the adaptation of the invention to a track in a tunnel. Fig. 9 is a side elevation of a long car adapted for straight or slightly-curved tracks, and Fig. 10 is a detail view of the track and magnet. Fig. 11 is a side elevation of a motor-vehicle for drawing the cars. Fig. 12 is a detail view of a construction which will be hereinafter described. This is adapted to the motor-vehicle.

Referring first to Figs. 1 to 4, 1 designates the body of the car, having, as seen in Fig. 1, conical or pointed extremities, so as to offer a minimum resistance to the air when moving at a high speed. 2 designates the track-rails mounted or supported on any form of base suited best to the roadway. It is contemplated that the rails shall be laid on an elevated structure, as that will be best suited to high-speed trains making few stops. Along the inner side of the track-rail and fixed rigidly with or forming a part thereof is a flange 3, which will be hereinafter called the "armature-rail." This armature-rail will be smooth on its under side, but not necessarily polished. The rails 3 will be practically continuous and will be carefully laid. 4 designates beams extending transversely under the bottom of the car and secured firmly thereto. These beams carry at their respective ends electromagnets 5, the pole-faces of which are directed upward and which will be in contact with the under surfaces of the respective armature-rails when the car is in motion, the faces of the poles gliding over the lower faces of the rails. Preferably the U-shaped magnets will take under the beam 4 and be secured thereto with a stirrup and bolt, as shown in Fig. 4. This permits the magnet to rock about the bolt, and thus adjust itself in moving about curves. In the car and, as shown in Fig. 2, in a box under the floor of the car are storage batteries 6, which are employed to energize the magnets 5. It has not been deemed necessary to show the wiring by which the current is supplied to the coils of the several magnets, as this is a matter within the knowledge of any electrical engineer.

On the sides of the car are rotatively mounted in any convenient manner small flanged wheels 7. These are over and normally elevated slightly above the track-rails 2. The function of these wheels is twofold. In case the car is moving about a curve the flanges on the wheels will keep the car alined with the rails, and in shifting the car about the yard or switching it from one track to another at the terminus the current through the magnets may be cut off and the car allowed to run on these wheels. The wheels are also convenient for supporting the car while the batteries are being renewed or in case of a break in the circuit connections at an inopportune time.

There must be as many magnets as may be required to support the weight of the car and its load with a margin of safety, and the friction tending to resist the movement of the car over or along the track will be measured directly by the excess of the lifting power of the magnets employed over the weight to be lifted, and hence the best results will be obtained when this excess is small.

To keep the under surface of the armature-rail free from accumulations of dust and the like and to oil or lubricate the said surface, suitable devices carried by the car may be employed. These devices are seen in Figs. 1 and 3. For removing the dust a brush 8 of any kind may be employed, and for oiling the surface an oiler 9 is used, which may have a hollow or tubular stem 10, through which oil is fed to the absorbent material of the oiler.

It will be noted in Fig. 1 that the car is relatively short and the magnets and wheels are not extended, but rather grouped near the middle part of the car. This is to enable the car to pass around curves conveniently. Where the line of the railway is substantially straight, this feature may, however, be disregarded and the cars made of any convenient or suitable length.

Preferably the under surface of the flange or armature rail 3 will be of soft Swedish iron; but this is not essential to the operation of the device. In Figs. 2 and 3, for example, $3^a$ represents a plate of Swedish iron.

Figs. 5 and 6 illustrate a construction embodying the invention wherein the car $1^a$ is, as seen in Fig. 5, of substantially the ordinary shape, and the electromagnets $5^a$ are constructed and mounted somewhat differently from those seen in Figs. 1 to 4. In this construction the storage batteries 6 are placed under the seats 11 of the car, and the bar of the magnet extends across under the car and is secured rigidly thereto, its ends carrying the pole-pieces being turned up, as shown. In other respects the construction is the same as that shown in Figs. 1 to 5.

Fig. 7 illustrates another construction of the car adapted especially to an elevated structure or way. In this construction the car has in addition to the set of electromagnets $5^a$, disposed substantially as in Fig. 6, another set of electromagnets $5^b$, which extend down outside of the track-rail 2. Their upwardly-directed pole-pieces bear on and slide along an auxiliary armature-rail $3^b$, formed on the under side of the base of a stringer 12, forming a part of the elevated structure 13. In this construction the flanged wheels 7 are so placed as to utilize the armature-rail 3 as a track-rail, the main rails 2 being reserved for the motor which draws the train or car.

Obviously my invention is not restricted to placing the armature-rails below and adjacent to the track-rails on which the motor runs which draws the car. They may be placed above, as indicated in Fig. 8, which is a somewhat diagrammatic view illustrating my invention applied to a car in a tunnel or subway. In this construction the armature-rails 3 are carried by brackets 14 in the subway, and the electromagnets 5 are at the top of the car.

Fig. 9 shows a long car adapted for a straight or only moderately-curved railway. In this construction the magnets 5 are carried by pendent arms 15 and may turn pivotally about the same at 16 to accommodate themselves to curves in the armature-rails. These latter are made exceptionally wide at the curves, as seen at $3^c$ in Fig. 10, for the same reason—that is, to allow lateral play of the magnets at curves.

In Fig. 9 is shown a suitable motor-vehicle or locomotive M for propelling the cars along the track. This motor-vehicle may be driven by any power; but, as herein shown, it is supposed to be driven by an electric motor supplied either by storage batteries or by a "third rail" or the like along the track or railway.

Fig. 12 is a fragmentary view illustrating a construction when the car $1^b$ has wheels $7^a$, which normally run on track-rails $2^a$. These rails are supported on metal stringers that have armature-rails 3 mounted on them. The poles of the electromagnets $5^a$ are out of contact with the armature-rail; but the magnets will be normally excited, so as to exert a strong pull or attraction tending to lift the car from track, and thereby reducing the friction of the wheels thereon. This feature may be applied either to cars or to the locomotive, the latter case being designed to reduce the weight of the locomotive on the track-rails and allow it to run lighter.

Obviously the electric energy employed to energize the magnets where electromagnets are used may be (and preferably will be) derived from storage batteries carried by the car or vehicle; but my invention is not limited in this respect. The electricity for this purpose may be supplied from any source by any of the well-known means common on electrically-propelled cars, for example.

Being the first, as I believe, to employ magnets in relation to vehicles or cars and railways disposed in such a manner as to reduce the weight or pressure of the vehicle on the track or way, and thus reduce the friction tending to resist the movement of the vehicle along the track or way, I claim this feature broadly and without restriction or limitation to the specific construction and disposition of the parts. Obviously these details of construction may be greatly varied without departing from my invention.

Having thus described my invention, I claim—

1. A railway having along its line and substantially parallel with its track rail or rails, an armature-rail, and a car or vehicle, for said railway, carrying a magnet, the pole piece or pieces of which are so disposed as to move in a path below and under said armature-rail when the car is in motion, with their poles directed toward the smooth under face of said armature-rail.

2. A railway having track-rails and an armature-rail adjacent to each track-rail and extending substantially parallel therewith, and a car or vehicle for said railway, said car or vehicle carrying magnets the pole-pieces of which are so disposed as to move in paths below and under said armature-rails, respectively, when the car is in motion, with their poles directed toward the smooth under faces of the said armature-rails.

3. A railway having track-rails and having extending along its line, substantially parallel with the track, an armature-rail, and a car or vehicle for said railway, said car or vehicle being provided with a magnet, the pole piece or pieces of which are so disposed as to move in a path below and under said armature-rail with the faces of their poles in rubbing contact with the smooth under face of said rail.

4. A railway having a track-rail, and an armature-rail extending along the track and substantially parallel therewith, and a car or vehicle to run on said track, said car or vehicle having flanged wheels alined with the track-rail, and having also a magnet the poles of which are under said armature-rail when the car is on the track, the wheels and the magnet being so disposed with respect to the track-rail and armature-rail that when the pole of the magnet is in rubbing contact with the under face of the armature-rail, the wheels will be lifted off from the track-rail.

5. A car or vehicle for a railway carrying a magnet or magnets, the poles of which are directed upward, substantially as and for the purpose set forth.

6. A car or vehicle for a railway having flanged wheels and carrying a magnet or magnets with its poles directed upward, substantially as and for the purpose set forth.

7. The combination with two armature-rails placed parallel to form a railway, said rails being smooth on their under sides, of a car provided with magnets having their poles directed upward and with their faces in contact with the under faces of the armature-rails.

In witness whereof I have hereunto signed my name, this 7th day of April, 1902, in the presence of two subscribing witnesses.

ALBERT C. ALBERTSON.

Witnesses:
  HENRY CONNETT,
  PETER A. ROSS.